United States Patent
Gruenter et al.

(10) Patent No.: US 7,481,103 B2
(45) Date of Patent: Jan. 27, 2009

(54) ENGINE CONTROL DEVICE

(75) Inventors: Thomas Gruenter, Steinheim-Höpfigheim (DE); Marko Geertz, Mönsheim (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 72 days.

(21) Appl. No.: 11/799,061

(22) Filed: Apr. 30, 2007

(65) Prior Publication Data
US 2007/0255528 A1 Nov. 1, 2007

(30) Foreign Application Priority Data
Apr. 29, 2006 (DE) .................. 10 2006 020 065

(51) Int. Cl.
*G01M 15/00* (2006.01)
(52) U.S. Cl. .................. 73/114.61; 73/114.15
(58) Field of Classification Search ............ 73/114.13, 73/114.14, 114.15, 114.25, 114.58, 114.61, 73/114.77
See application file for complete search history.

(56) References Cited

U.S. PATENT DOCUMENTS

| 6,964,192 B2 * | 11/2005 | Bauer et al. ............. 73/114.15 |
| 7,373,920 B2 * | 5/2008 | Gruenter ................. 123/361 |
| 2003/0037766 A1 * | 2/2003 | Wagner et al. ............ 123/359 |
| 2006/0293150 A1 * | 12/2006 | Baur et al. .............. 477/203 |

FOREIGN PATENT DOCUMENTS

| DE | 101 61 981 A1 | 7/2002 |
| DE | 10 2004 011 814 A1 | 9/2005 |

* cited by examiner

*Primary Examiner*—Eric S McCall

(57) ABSTRACT

An engine control device controls an engine of a motor vehicle. The engine control device predefines an admissible engine torque on the basis of a torque envelope curve in dependence on an accelerator pedal position and an engine speed. The engine control device is connected to a diagnostic device. An intervention variable, that represents an engine torque and/or an engine speed and on the basis of which the engine can be actuated for test/diagnostic purposes, can be predefined for the engine control device by the diagnostic device. When at least one test criterion is fulfilled in the engine control device and/or the diagnostic device, the torque envelope curve of the engine control device can be widened or bypassed for test/diagnostic purposes in such a way that given an unactivated accelerator pedal for a defined engine torque at the request of the diagnostic device a larger engine torque is admissible.

8 Claims, 1 Drawing Sheet

ENGINE CONTROL DEVICE

CROSS-REFERENCE TO RELATED APPLICATION

This application claims the priority, under 35 U.S.C. §119, of German application DE 10 2006 020 065.9-52, filed Apr. 29, 2006; the prior application is herewith incorporated by reference in its entirety.

BACKGROUND OF THE INVENTION

Field of the Invention

The invention relates to an engine control device of a motor vehicle. The engine control device predefines an admissible engine torque on a basis of a torque envelope curve as a function of an accelerator pedal position and an engine speed. The engine control device has an interface for connecting to a diagnostic device. An intervention variable, which represents an engine torque and/or an engine speed and on the basis of which the engine can be actuated for test purposes and/or diagnostic purposes, can be predefined for the engine control device by the diagnostic device.

The supply of combustion air to an engine of a motor vehicle is set by an opening position or angular position of a throttle valve of the engine. The quantity of fuel that is fed to the engine is determined as a function of the supply of combustion air to the engine in order, in this way, to set the composition of the ignitable combustion air/fuel mixture, and thus ultimately determine the engine torque that is made available by the engine.

The operation of an engine is open-loop and/or closed-loop controlled by an engine control device, engine control devices which electrically or electronically adjust the throttle valve of an engine already being known from practice. Such a functionality of engine control devices is also referred by the term electronic accelerator pedal (E-Gas). In this context, the engine control device monitors the activation of an accelerator pedal by a driver, using an accelerator pedal value signal generator which transmits an electrical or electronic measured variable to the engine control device which determines a setpoint value for the angular adjustment or open position of the throttle valve on the basis of the electrical or electronic measured variable of the accelerator pedal. In this context the adjustment signal for the throttle valve can be influenced, with a high degree of variability, by other systems and control devices, for example by a gear control device.

In this context in engine control devices with such electronic and/or electrical adjustment of the throttle valve, what is referred to as a torque envelope curve is stored as a safety concept in the engine control device, the curve mainly predefining an admissible engine torque for the engine of a motor vehicle as a function of an accelerator pedal position and an engine speed.

On the basis of such a torque envelope curve, the engine control device permits only a relatively small engine torque given an unactivated accelerator pedal and given a predefined engine speed.

Engine control devices that are known from practice also have an interface to which a diagnostic device can be connected for test purposes or diagnostic purposes for factory diagnostics within the scope of a vehicle production system or for workshop diagnostics within the scope of a vehicle maintenance system. An intervention variable which represents an engine torque and/or an engine speed and on the basis of which the engine is to be actuated for test purposes or diagnostic purposes can be predefined for the engine control device by the diagnostic device.

However, in this context, given an unactivated accelerator pedal the torque envelope curve which is stored in the engine control device restricts the admissible engine torque so that to date the accelerator pedal has had to be activated by a certain amount when factory diagnostics or workshop diagnostics are carried out, in order to avoid a conflict with the torque envelope curve. For this purpose, for factory diagnostics or workshop diagnostics either a worker has to activate the accelerator pedal of the motor vehicle or a specially adapted device, which ensures that the accelerator pedal is activated, has to be mounted in the motor vehicle. Both variants accordingly require additional operations on the motor vehicle in order to carry out diagnostic work or test work on the motor vehicle.

SUMMARY OF THE INVENTION

It is accordingly an object of the invention to provide an engine control device which overcomes the above-mentioned disadvantages of the prior art devices of this general type, and is a novel engine control device for a motor vehicle.

With the foregoing and other objects in view there is provided, in accordance with the invention, an engine controller for an engine of a motor vehicle. The engine controller has an engine control device predefining an admissible engine torque on a basis of a torque envelope curve in dependence on an accelerator pedal position and an engine speed. The engine control device has an interface for connecting to a diagnostic device. The diagnostic device predefines an intervention variable for the engine control device. The intervention variable represents an engine torque and/or an engine speed and on a basis of the intervention variable the engine is actuated for test purposes and/or diagnostic purposes. When at least one test criterion is fulfilled in the engine control device and/or the diagnostic device, the torque envelope curve of the engine control device can be widened or bypassed for test purposes or diagnostic purposes such that given an unactivated accelerator pedal for a defined engine torque at a request of the diagnostic device a larger engine torque is admissible than the engine torque predefined by the torque envelope curve given the unactivated accelerator pedal and a defined engine speed.

According to the invention, when at least one test criterion is fulfilled in the engine control device and/or the diagnostic device, the torque envelope curve of the engine control device can be widened or bypassed for test purposes or diagnostic purposes in such a way that given an unactivated accelerator pedal for a defined engine torque at the request of the diagnostic device a larger engine torque is admissible than the engine torque predefined by the torque envelope curve given an unactivated accelerator pedal and the defined engine speed.

In the sense of the present invention it is proposed that the diagnostic device can predefine engine torque-increasing and/or engine speed-increasing intervention variables for widening or bypassing the torque envelope curve of the engine control device, specifically if at least one test criterion or monitoring criterion is fulfilled in the engine control device and/or the diagnostic device. As a result it is possible to dispense with the need for a worker or an adapted device having to activate the accelerator pedal of the motor vehicle when factory diagnostics or workshop diagnostics are carried out. As a result, the effectiveness of factory diagnostics and workshop diagnostics can be increased compared to the prior art.

According to one advantageous development of the invention, the torque envelope curve of the engine control device can be widened or bypassed exclusively for test purposes or diagnostic purposes for factory diagnostics at the end of a motor vehicle production system, for which purpose the widening or bypassing of the torque envelope curve can be blocked automatically and irreversibly, in particular when a defined number of engine starts is exceeded.

Other features which are considered as characteristic for the invention are set forth in the appended claims.

Although the invention is illustrated and described herein as embodied in an engine control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
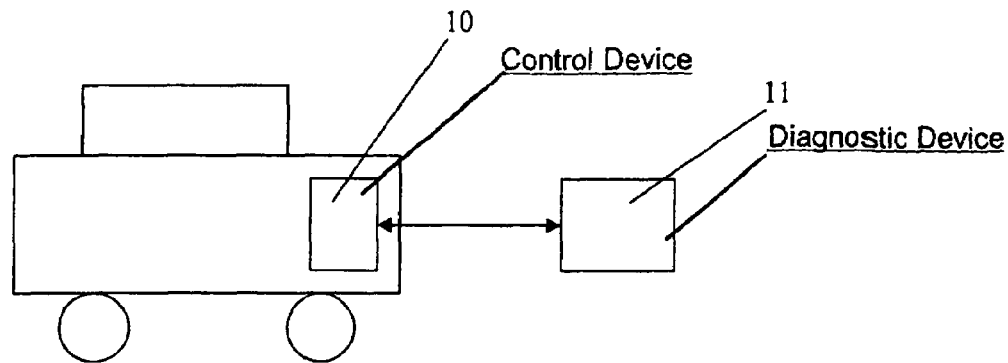
FIG. 1 is a schematic illustration of a motor vehicle with an engine control device and a diagnostic device which is connected to the engine control device.

Referring now to the figures of the drawing in detail and first, particularly, to FIG. 1 thereof, there is shown in a highly schematic fashion a motor vehicle with an engine control device 10. A diagnostic device 11 is connected via a non-illustrated interface to the engine control device 10 of the motor vehicle in order to carry out factory diagnostics or workshop diagnostics. The engine control device 10 is an engine control device with what is referred to as an EGAS functionality.

In such an EGAS functionality, the activation of an accelerator pedal of the motor vehicle is monitored using an accelerator pedal value signal generator, in which process the engine control device 10 generates, on the basis of the measured variable of the accelerator pedal value signal generator and, if appropriate, on the basis of intervention variables of further control devices of the motor vehicle and/or external diagnostic devices, an electrical and/or electronic adjustment variable for adjusting a throttle valve of the engine.

In this context, a torque envelope curve which predefines an admissible engine torque as a function of the activation of the accelerator pedal and an engine speed is stored in the engine control device 10. Thus, FIG. 2 shows in a highly schematic form a torque envelope curve 12 that is valid for an unactivated accelerator pedal, in a diagram in which the engine speed n is plotted on the horizontally extending axis, and the engine torque M is plotted on the vertically extending axis.

Figure 2:
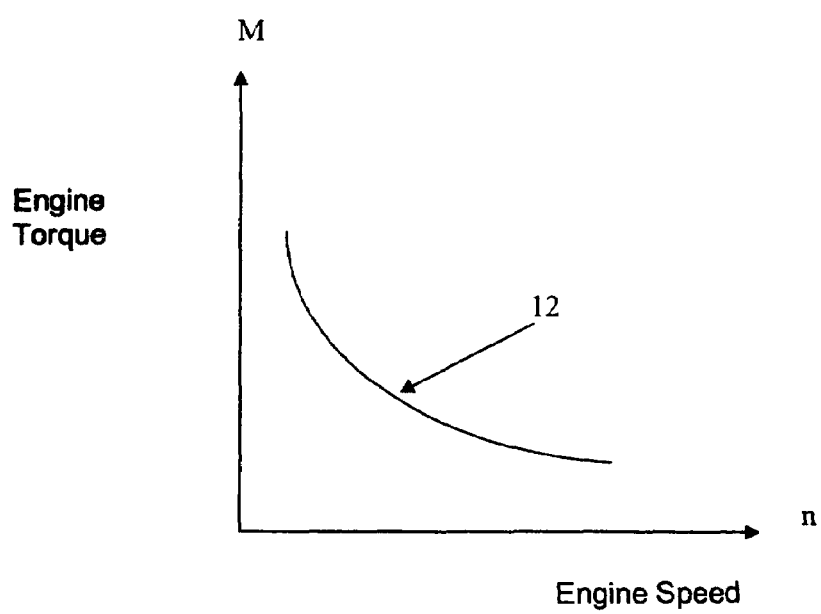
FIG. 2 is a graph clarifying the problem of the original control device according to the invention.

Thus, from FIG. 2 it is apparent that such a torque envelope curve 12 permits only a relatively small engine torque given an unactivated accelerator pedal and given relatively high engine speeds. If, accordingly, an intervention variable which represents an engine torque and/or an engine speed and on the basis of which a relatively high engine torque is desired given a defined engine speed is predefined by the diagnostic device 11 for test purposes or diagnostic purposes, this conflicts with the torque envelope curve 12 given an unactivated accelerator pedal, for which reason, given an engine control device which is known from practice and has the purpose of carrying out factory diagnostics and/or workshop diagnostics, the accelerator pedal of the motor vehicle has to be activated by a worker or an especially adapted device in order to avoid a conflict with the torque envelope curve.

In the sense of the present invention here, when at least one test criterion or monitoring criterion is fulfilled in the engine control device 10 and/or in the diagnostic device 11, the torque envelope curve which is stored in the engine control device 10 can, for test purposes or diagnostic purposes, be widened or bypassed for factory diagnostics and/or workshop diagnostics in such a way that given an unactivated accelerator pedal for a defined engine speed at the request of the diagnostic device a larger engine torque is admissible than the engine torque which is predefined by the torque envelope curve given an unactivated accelerator pedal and the defined engine speed.

As a result, it is possible to dispense with activation of the accelerator pedal, whether by a worker or a specially adapted device, for factory diagnostics and/or workshop diagnostics.

The torque envelope curve of the engine control device can preferably be widened or bypassed for test purposes or diagnostic purposes only if the motor vehicle is stationary with the diagnostic device connected, that is to say if the speed of the motor vehicle is less than a defined limiting value.

As already mentioned above, the diagnostic device predefines, for test purposes or diagnostic purposes, an intervention variable that represents an engine torque and/or an engine speed for the engine control device. In the process, the diagnostic device can directly predefine a desired engine torque for the engine control device, on the other hand it is also possible for the diagnostic device to predefine for the engine control device a desired engine speed on the basis of which the engine control device then calculates the engine torque. It is also possible for the diagnostic device of the engine control device to predefine, instead of specific values for an engine speed and/or for an engine torque, only variables for which corresponding values of an engine torque and/or of an engine speed are then stored in the engine control device.

According to one advantageous development of the present invention here, it is possible to provide that the torque envelope curve which is stored in the engine control device can be widened or bypassed exclusively for test purposes or diagnostic purposes for factory diagnostics at the end of a motor vehicle production system when the diagnostic device is connected. This can be implemented, for example, by virtue of the fact that the widening or bypassing of the torque envelope curve can be blocked or locked out irreversibly, in particular by virtue of the fact that the widening or bypassing of the torque envelope curve is automatically and irreversibly blocked when a criterion is exceeded, preferably when a defined number of engine starts are exceeded. As a result, a type of electronic tear off screw can be implemented which permits the widening or bypassing of the torque envelope curve exclusively at the end of the motor vehicle production process.

In the sense of the present invention here, the torque envelope curve of the engine control device can be widened or bypassed for test purposes or diagnostic purposes only if at least one test criterion or monitoring criterion is fulfilled in the engine control device and/or in the diagnostic device.

This can be implemented, for example, by virtue of the fact that the engine control device and the diagnostic device check the fulfillment of test criteria or monitoring criteria in the sense of a handshake test between the engine control device and the diagnostic device, and permit the widening or bypassing of the torque envelope curve of the control device only if the test has been passed successfully.

The approval testing for the widening or bypassing of the torque envelope curve for test purposes or diagnostics purposes can also be implemented by virtue of the fact that the diagnostic device of the engine controller transmits at least one diagnostic message on the basis of which it is checked whether the widening or bypassing of the torque envelope curve is admissible. Such a diagnostic message preferably contains not only the basic intervention request and the intervention variable which represents an engine torque and/or an engine speed, but also a message counter and a message checksum, in which case the widening and bypassing of the torque envelope curve is admissible only if the message counter and the message checksum fulfill predetermined test criteria. For example, it must be ensured that the message counter is increased by a predetermined amount whenever a diagnostic message is transmitted, with this amount being counterchecked with the message checksum. This test can be supplemented by a complementary test in order to increase the reliability. Furthermore, the checking can be carried out repeatedly or redundantly at a plurality of levels of the engine control device and/or diagnostic device so that they take one another into account in the approval testing, thus increasing the reliability of the approval testing.

Only if, as already mentioned, at least one test criterion of the approval test is fulfilled in the engine control device and/or the diagnostic device, is it possible for the torque envelope curve of the engine control device to be widened or bypassed for test purposes or diagnostic purposes.

Furthermore it is possible to provide for widening or bypassing of the torque envelope curve stored in the engine control device to be permissible on the basis of intervention variables of a diagnostic device only if the diagnostic device knows an access code which is stored in the engine control device and can switch on or switch off the inventive functionality of the widening or bypassing of the torque envelope curve on the basis of this access code.

We claim:

1. An engine controller for an engine of a motor vehicle, the engine controller comprising:
    an engine control device predefining an admissible engine torque on a basis of a torque envelope curve in dependence on an accelerator pedal position and an engine speed, said engine control device having an interface for connecting to a diagnostic device, the diagnostic device predefining an intervention variable for said engine control device, the intervention variable representing at least one of an engine torque and the engine speed and on a basis of the intervention variable the engine being actuated for at least one of test purposes and diagnostic purposes, when at least one test criterion being fulfilled in at least one of said engine control device and the diagnostic device, the torque envelope curve of said engine control device can be one of widened and bypassed for one of test purposes and diagnostic purposes such that given an unactivated accelerator pedal for a defined engine torque at a request of the diagnostic device a larger engine torque is admissible than the engine torque predefined by the torque envelope curve given the unactivated accelerator pedal and a defined engine speed.

2. The engine controller according to claim 1, wherein the torque envelope curve of said engine control device can be one of widened and bypassed for one of test purposes and diagnostic purposes only if the motor vehicle is stationary.

3. The engine controller according to claim 1, wherein fulfillment of the at least one test criteria in at least one of said engine control device and the diagnostic device can be tested as a test between said engine control device and the diagnostic device.

4. The engine controller according to claim 1, wherein for checking whether the at least one test criteria which are predetermined in said engine control device and the diagnostic device are fulfilled, the diagnostic device for said engine control device transmits at least one diagnostic message, on a basis of which it is checked whether the widening or bypassing of the torque envelope curve is admissible.

5. The engine controller according to claim 4, wherein the diagnostic message also contains, in addition to an intervention request and the intervention variable which represents at least one of the engine torque and the engine speed, a message counter and a message checksum, wherein the widening or bypassing of the torque envelope curve, is admissible only if the message counter and the message checksum fulfill predetermined test criteria.

6. The engine controller according to claim 1, wherein the torque envelope curve of said engine control device can be one of widened and bypassed for one of test purposes and diagnostic purposes for factory diagnostics at an end of a motor vehicle production system and/or in workshop diagnostic systems.

7. The engine controller according to claim 6, wherein the torque envelope curve of said engine control device can be one of widened and bypassed exclusively for one of test purposes and diagnostic purposes for the factory diagnostics at the end of the motor vehicle production system, the widening or bypassing of the torque envelope curve can be blocked automatically and irreversibly.

8. The engine controller according to claim 6, wherein the torque envelope curve of said engine control device can be one of widened and bypassed exclusively for one of test purposes and diagnostic purposes for factory diagnostics at the end of the motor vehicle production system, the widening or bypassing of the torque envelope curve can be blocked automatically and irreversibly if a defined number of engine starts is exceeded.

* * * * *